Oct. 10, 1933.  G. S. ROGERS  1,929,854
COUPLING
Filed May 7, 1932
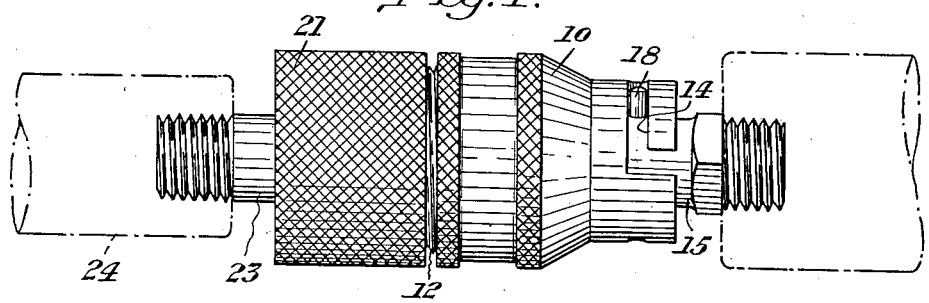
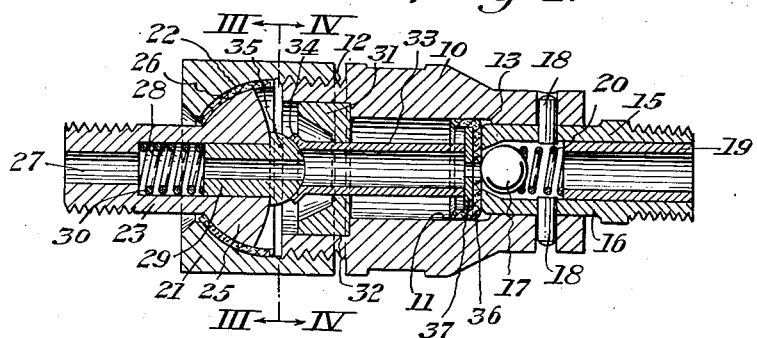
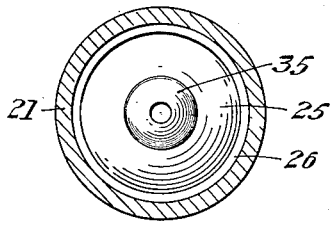
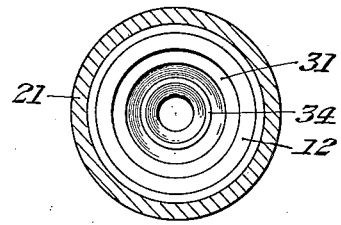
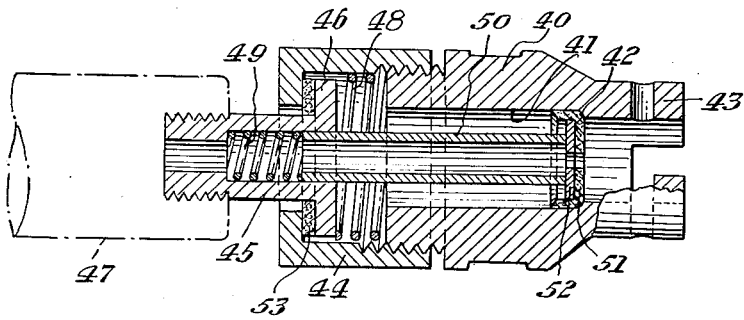
INVENTOR
Gerald S. Rogers
by his attorneys
Byrnes, Stebbins, Parmelee & Brenko Patented Oct. 10, 1933

1,929,854

UNITED STATES PATENT OFFICE 1,929,854

COUPLING

Gerald S. Rogers, Pittsburgh, Pa.

Application May 7, 1932. Serial No. 609,844

5 Claims. (Cl. 285—95)

My invention relates to a coupling and, in particular to a coupling adapted for making connection between a source of fluid such as a lubricant, under pressure, and a receptacle or fitting designed to receive the fluid.

Although numerous types of couplings have been known and used heretofore, many of such couplings are characterized by complexity of construction, high cost of manufacture, and difficulty of maintenance for continued operation. It is an object of the invention, therefore, to improve generally upon the construction of couplings of the type mentioned and to produce a device of this character which is simple in construction, can be manufactured cheaply, and used by an unskilled operator without the danger c failure during use.

It is a further object of the invention to provide a coupling permitting universal movement relative to one of the conduits associated therewith.

For a complete understanding of the invention, reference is made to the accompanying drawing illustrating a present preferred embodiment.

In the drawing:—

Figure 1 is a side elevation of the invention associated with a fluid delivering conduit and a fluid receptacle or lubricant fitting;

Figure 2 is a longitudinal section through the coupling;

Figures 3 and 4 are sectional views taken substantially along the same line of Figure 2, looking in the direction indicated by the correspondingly numbered arrows, and Figure 5 is a view similar to Figure 2 showing a modified form of construction.

Referring in detail to the drawing, the coupling comprises a barrel 10 having an axial bore 11 and a reduced threaded shoulder 12. A portion of the bore 11 is of reduced diameter forming a shoulder at 13. Bayonet slots 14 are formed in the unthreaded end of the barrel 10 for cooperation with a pin fitting 15 which is described in greater detail and claimed in my copending application, Serial No. 609,843, filed May 7, 1932, for Lubricating fitting. Briefly, the fitting comprises a tubular shell 16 in one end of which is seated a ball closure 17. Pins 18 are inserted from opposite sides of the shell. A sleeve 19 is forced into the shell and a spring 20 seated on the sleeve urges the ball closure toward its seat.

A knurled cap 21 which is threaded so as to screw on the shoulder 12 of the barrel 10 has a hemispherical surface 22 formed therein. A nipple 23 extending through the open end of the cap 21 has a threaded end for attachment to a conduit 24 and an enlarged hemispherical head 25 seated on the surface 22 concentric therewith. A sealing gasket 26 is disposed between the head 25 and the cap 21. The conduit 24 preferably is connected to a source of fluid, such as a lubricant of any desired character, to which pressure may be applied.

The nipple 23 has a bore 27 opening into an enlarged cylindrical recess or chamber 28. A nozzle 29 is positioned in said recess and is backed up by a spring 30.

A collar 31 is seated in an enlarged portion 32 of the bore 11 in the barrel 10, and a tube 33 extends through the collar 31. The tube 33 has one end swaged outwardly at 34 to form a seat for a hemispherical tip 35 on the nozzle 29 concentric with the recess 22 and head 25. The other end of the tube engages a perforated piston reciprocable in the bore 11. The piston comprises a cup washer 36 backed up by a disc 37.

When the fitting 15 is separated from the coupling, the spring 30 advances the nozzle 29 and the tube 33 until the cup washer 36 engages the shoulder 13 in the bore 11. The ball closure 17 of the fitting, of course, engages its seat firmly when removed from the coupling.

When the fitting is inserted in the coupling or rather when the coupling is applied to the fitting, the end or nose of the shell 16 engages the cup washer 36 and forces the tube 33 and the nozzle 29 backward against the force of the spring 30. The engagement of the washer 36 with the closure 17 opens the latter, although it normally closes the opening in the washer. If pressure is applied to the fluid in the conduit 24, it will advance through the nipple 23, the nozzle 29, the tube 33, and the washer 36. The fluid will then displace the ball 17 and enter the tubular shell 16. As soon as the pressure is released, the ball 17 again closes the hole in the washer 36.

A fluid-tight seal is maintained by the engagement of the washer 36 with the end of the shell 16. The flange of the cup washer 16, furthermore, prevents leakage of fluid between the barrel 10 and the washer. The threaded joint between the cap 21 and the barrel 10 is fluid-tight and the gasket in the cap 21 makes a fluid-tight joint with the head 25 of the nipple 23. Universal movement of the nipple with respect to the rest of the coupling, however, is permitted, but since all the joints and connections are fluid-tight, no leakage can occur.

In a modified form of the invention, a barrel 110

40 has an axial bore 41, a shoulder 42, and a nose 43 for receiving a fitting such as that shown at 15. A cap 44 is threaded on to the barrel. A nipple 45 having a flange 46 is seated in a recess in the cap and is threaded to a conduit 47. A spring 48 normally seats the flange 46 against the end wall of the cap 44.

A spring 49 seated in the bore of the nipple 45 normally urges a tube 50 and a piston including a cup washer 51 and back-up disc 52 against the shoulder 42.

The operation of the modification of Figure 5 is similar to that of the embodiment already described. The principal difference is in the details of construction permitting universal movement of the nipple with respect to the coupling. In the form of the invention shown in Figure 5, universal movement of the nipple necessitates tilting of the axis thereof so that the flange 46 leaves the end wall of the collar 44, except for one point of tangency. The spring 49 is likewise compressed slightly. A gasket 53 between the flange 46 and the end wall of the collar 44 maintains the joint therebetween fluid-tight.

It will be apparent from the foregoing description that the invention provides a coupling for fluid lines which is characterized by numerous advantages. The simplicity of construction will be obvious on inspection of the drawing and the comparatively low cost of manufacture is readily deducible therefrom. The construction, furthermore, is very rugged, so that a long, useful life is assured without the annoyance of maintenance difficulties. All the joints in the coupling are permanently fluid-tight, although universal movement of the inlet nipple is permitted. The coupling also makes a tight joint with the fitting to which it is attached. At the same time, the flow of the fluid through the coupling is substantially unimpeded.

Although I have illustrated and described herein but a single preferred embodiment of the invention, together with a modificaiton thereof, the invention may, of course, be embodied in other forms than that shown within the scope of the appended claims.

I claim:

1. In a coupling, a barrel, a perforate piston therein adapted to engage a tubular member inserted into one end of the barrel, a cap on the other end of the barrel having a hemispherical seat therein, a nipple extending into the cap and having a hemispherical enlarged portion engaging said seat, a tube including a universal joint extending from said portion to said piston, and a spring for urging the tube against said piston.

2. In a coupling, a barrel, a perforate piston therein adapted to engage a tubular member inserted into one end of the barrel, a cap on the other end of the barrel having a seat therein, a nipple extending into the cap and having an enlarged portion engaging said seat, a tube extending from said portion to said piston, and a spring for urging the tube against said piston.

3. In a coupling, a barrel, a perforate piston therein adapted to engage a tubular member inserted into one end of the barrel, a cap on the other end of the barrel, a nipple extending into the cap, a jointed tube extending from the nipple to the piston, and a spring tending to move the nipple against the cap and the tube against the piston.

4. In a coupling, a barrel, a perforate piston therein adapted to engage a tubular member inserted into one end of the barrel, a cap on the other end of the barrel, a nipple extending into the cap, a tube extending from the nipple to the piston, and a spring tending to move the nipple against the cap and the tube against the piston.

5. In a coupling, a barrel, a perforate piston reciprocable therein, a nipple extending into the barrel and movable universally relative thereto, a tube extending from the nipple to the piston, and a spring for moving the tube against the piston.

GERALD S. ROGERS.